June 18, 1968    L. K. ROSENVOLD ET AL    3,388,474
GEOMETRICAL INSTRUMENT
Filed Nov. 30, 1964

INVENTORS
LLOYD K. ROSENVOLD
ROBERT J. ROSENVOLD
BY Wynne & Finken,
ATTORNEYS

United States Patent Office 3,388,474
Patented June 18, 1968

3,388,474
GEOMETRICAL INSTRUMENT
Lloyd K. Rosenvold and Robert J. Rosenvold, both of
1101 Main St., Montrose, Colo. 81401
Filed Nov. 30, 1964, Ser. No. 414,599
1 Claim. (Cl. 33—1)

ABSTRACT OF THE DISCLOSURE

A geometrical instrument for measuring the slope of a curve at any point, for locating and drawing a tangent to a curve at any point, and for measuring the slope of a secant intersecting a curve at two or more points, said instrument comprising a transparent planar case member having a rotable circular member in a circular opening in the base, indicia on said circular member and base for indicating tangent values and slope values upon manipulation of the instrument and unevenly spaced lines on the base member and interrupted parallel lines on the circular member enabling the instrument to be precisely located over a particular point on a curve.

---

This invention relates to geometrical instruments and particularly to an instrument for measuring the slope of a curve at any point and for locating and drawing a tangent to a curve at any point.

Engineers, mathematicians, students and others concerned with curves, graphs and statistical or experimental data have long had need for a simple portable device for measuring slopes or drawing tangents to curves. While prior art devices have been proposed, they have been relatively complex, having parts which get out of adjustment, and which are not compact and hence not readily portable, of particular importance to students.

Among the objects of this invention is the provision of a simple, yet highly accurate, slope measuring instrument which is compact and readily portable and may be carried in a book or notebook or the like. Another object is to provide such an instrument which enables measurement of the slope of a secant intersecting a curve at two or more points. A further object is to provide an instrument which enables the reading of the slope of a curve in both degrees and the tangent value. Still another object is to provide an instrument for precisely locating and drawing a tangent or normal to a curve at any point. Another object is the provision of such an instrument which may be precisely oriented on graphs of any and varied grid sizes. Other objects and advantages will be apparent to those skilled in the art.

Figure 1:
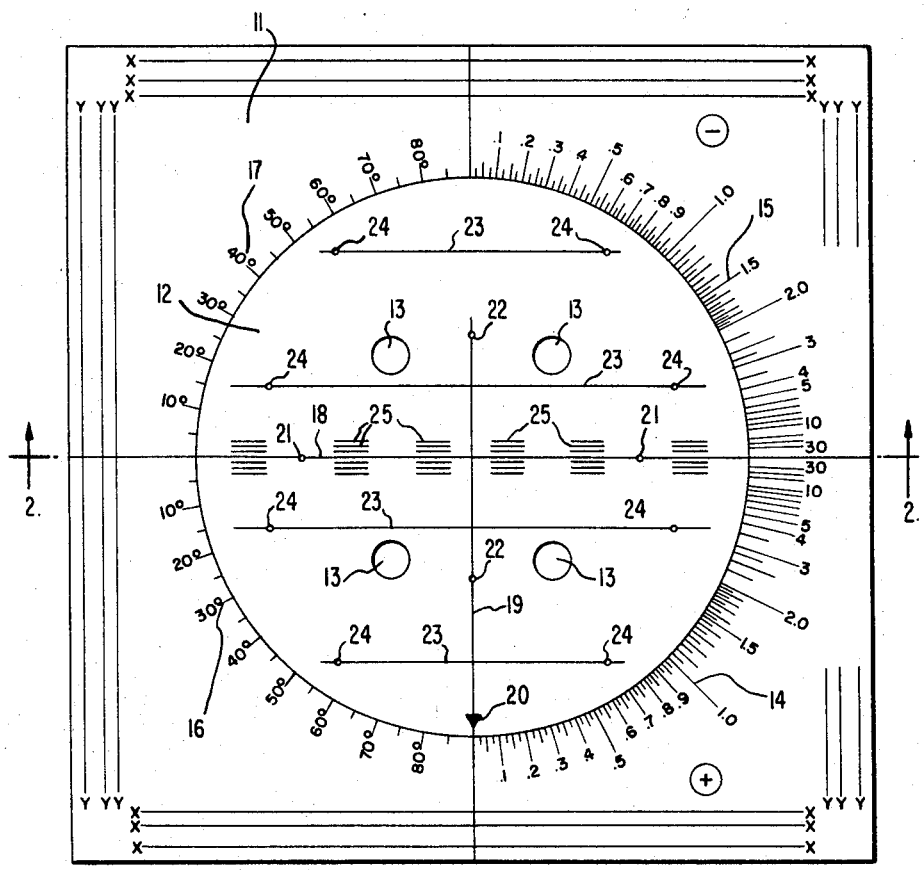
FIG. 1 is a top view of the geometrical instrument of this invention.
Figure 2:
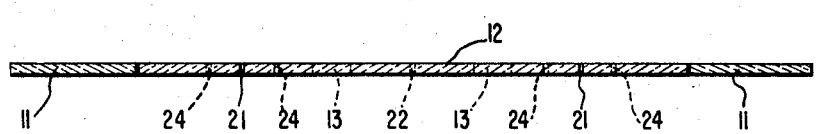
FIG. 2 is a cross section taken along lines 2—2 of FIG. 1.

Referring to FIGS. 1 and 2, the instrument comprises a flat planar base member 11 made of stiff transparent plastic material. The member 11 has a large circular opening therein and a circular member 12 is positioned therein, snugly fitting but rotatable with respect to the base member 11. The circular member 12 is similarly made of stiff transparent plastic and is provided with a plurality of openings 13 to facilitate rotation by the fingers of the user of member 12 with respect to the base 11.

Inscribed on the base 11 are a plurality of parallel lines X, X, X and, perpendicular thereto, lines Y, Y, Y, for orienting the base with respect to the graph on which the curve to be measured appears. It is to be noted that the spacing between adjacent X lines and Y lines is unequal, the purpose being to enable placement of at least one of such lines directly over a grid line on the graph to orient the base 11 and still provide the accurate positioning of the device directly at the point of the curve to be measured, as will appear in detail hereinafter.

Also inscribed on the base 11 along the circumference of the opening therein, in quadrants oriented with respect to the X and Y lines, are positive and negative tangent values 14 and 15 respectively, ranging from zero to infinity. Similarly, positive and negative angle values 16 and 17 respectively, in degrees, are inscribed along the circumference of the opening in base 11.

Circular member 12 has a line 18 inscribed along a diameter thereof. Intersecting diameter line 18 at the center of the member 12 is a radius line 19, perpendicular to diameter line 18, the radius line 19 extending only to one circumferential edge and having an indicator arrow 20 near the edge, the line 18 extending to the edge to enable more accurate reading of tangent values on the base 11. Two small holes 21 are provided in member 12 along the diameter line 18 for the purpose of enabling a pencil point to be placed therein to mark points for drawing a tangent. Similarly, holes 22 are provided on the radius line 19 for drawing a normal line. The circular member also has a plurality of secant lines 23 parallel to the diameter line 18 and pencil holes 24 are similarly provided along the secant lines. A plurality of interrupted guide lines 25, parallel to diameter line 18 are inscribed on either side thereof, the purpose being to facilitate the placement of diameter line 18 precisely tangent to a curve at a given point.

All the lines on both the base 11 and the circular member 12 are inscribed on the bottom surface of the device as viewed from the top as in FIG. 1, the purpose being to more accurately position the lines directly over a graph and to facilitate accurate reading, the thickness of the plastic material thereby not distorting or interfering with the viewing of the graph lines. It is also preferred to have the negative and positive angle and tangent values on the base inscribed in different colors, such as black for positive and red for negative, for example.

The instrument as shown in FIG. 1 indicates a slope of zero. In use, the base member 11 and circular member 12 assembled therewith is placed over the graph or curve to be measured, with the point of intersection of diameter line 18 and radius line 19 directly over the point of the curve to be measured. The base 11 is then adjusted so that at least one of the X or Y orienting lines is over and in alignment with a coordinate or grid line on the graph. With the instrument thus properly oriented, the circular member 12 is rotated, this being facilitated by the finger holes 13, until the diameter line 18 is tangent to the curve, this being facilitated by the guide lines 25. The tangent value or slope is then read at the arrow end 20 of radius line 19. The angle of the tangent in degrees may be read at the left end of diameter line 18 as viewed in FIG. 1. If desired, points defining the tangent or normal may be marked through pencil holes 21 or 22 respectively.

Figure 3:
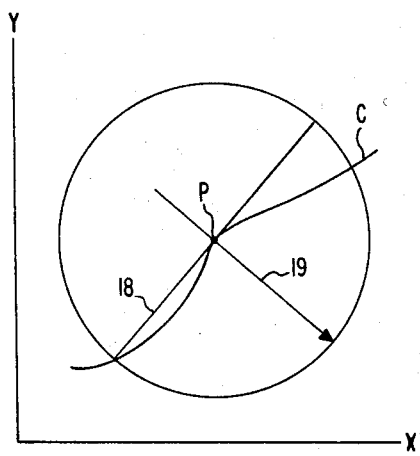
FIG. 3 illustrates the use of the instrument for measuring the slope of a curve or for drawing the tangent thereto.
Figure 4:
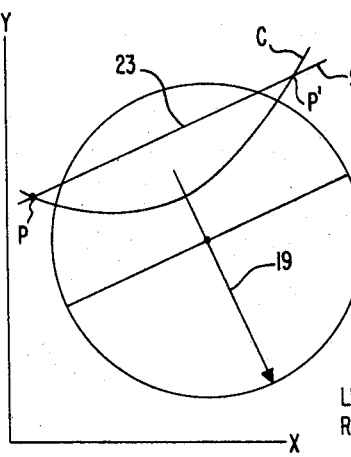
FIG. 4 illustrates the use of the instrument for measuring the slope of a secant to a curve.

FIG. 3 illustrates schematically the use of the instrument to measure the slope of curve C at point P, the diameter line 18 being positioned tangent to the curve at P and the radius line 19 indicating the slope. FIG. 4 illustrates schematically the use of the device to measure the slope of secant S which intersects curve C at points P and P'. The secant line 23 on the instrument is placed over the secant line S and the slope is read at the radius line 19.

It has been found that the narrowly spaced, intermittent parallel guide lines 25 greatly improve the accuracy with which tangents may be projected. Thus, these lines enable quick and accurate rotation of circular member 12 to a point at which the angles between the curve and the diameter line 18 are equal on opposite sides of the point at which the tangent is to be measured. It is also to be noted that the radius line 19 extends to the circumference of the circular member 12 at only one point and that the secant lines 23 end short of the circumference. This feature minimizes errors in reading the instrument. The flat, planar configuration of the instrument, with no projecting parts, facilitates easy storage and portability. The plurality of secant lines 23 permits the measurement of slopes of secants no matter where they may be located on a graph. The provision of the radial markings 14, 15, 16 and 17 depicting tangent values and degrees on the base member 11 makes for greater accuracy in reading the instrument by virtue of the larger circumferential area on which the markings appear.

It will be understood that the quadrants showing angles and slopes of the circular member 12 may be variously interposed as desired with appropriate correction of positive and negative values.

While the invention has been described and illustrated with reference to a particular preferred embodiment, it is understood that this is for purposes of illustration only, and it is intended to cover all further embodiments and modifications which fall within the spirit and scope of the appended claim.

We claim:
1. A geometrical instrument comprising a planar, transparent base member, said base member having a circular opening therein, radial indicia on said base member about the circumference of said opening for indicating tangent values, a first group of a plurality of spaced parallel lines on said base member angularly oriented with respect to the radial indicia thereon, a second group of a plurality of spaced parallel lines on said base member positioned perpendicularly to said first group of lines, said lines in each group being so arranged that any one of said lines between two adjacent lines is at one distance from one of said adjacent lines and at a different distance from the other of said adjacent lines, a planar transparent circular member rotatably positioned in and coextensive with the circular opening in said base member, said circular member having at least one opening therein whereby said circular member may be rotated with respect to said base member, a diameter line on said circular member bisecting the same, a radius line on said circular member perpendicular to said diameter line extending from the center of said circular member to the periphery thereof, indicia means on said radius line adjacent the periphery of said circular member, a plurality of secant lines on said circular member parallel to said diameter line, and a plurality of closely spaced, parallel interrupted guide lines on said circular member, parallel to and on both sides of said diameter line.

References Cited
UNITED STATES PATENTS

| | | | |
|---|---|---|---|
| 1,154,673 | 9/1915 | Van Ness | 33—104 XR |
| 1,262,971 | 4/1918 | Olson | 33—41 |
| 1,907,873 | 5/1933 | Richards et al. | |
| 1,933,880 | 11/1933 | Tihenko | 33—75 |
| 2,190,071 | 2/1940 | Keppers | 33—75 |
| 2,445,792 | 7/1948 | Lunney. | |

WILLIAM D. MARTIN, JR., *Primary Examiner.*

LEONARD FORMAN, *Examiner.*